United States Patent
Yuen et al.

(10) Patent No.: US 11,125,192 B2
(45) Date of Patent: Sep. 21, 2021

(54) CENTRIFUGAL AIR FILTER FOR AN AUTOMOTIVE SYSTEM

(71) Applicant: DEERE & COMPANY, Moline, IL (US)

(72) Inventors: Ming Parker Yuen, Heidelberg (DE); Phouphadeth Sananikone, Ludwigshafen (DE); Dierk Esau, Neulussheim (DE); Alexander Berg, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/854,662

(22) Filed: Apr. 21, 2020

(65) Prior Publication Data

US 2020/0355145 A1    Nov. 12, 2020

(30) Foreign Application Priority Data

May 7, 2019    (DE) .......................... 102019003209.8

(51) Int. Cl.
| | | |
|---|---|---|
| *B01D 50/00* | (2006.01) | |
| *F02M 35/022* | (2006.01) | |
| *B01D 45/02* | (2006.01) | |
| *B01D 45/14* | (2006.01) | |
| *B01D 46/00* | (2006.01) | |

(Continued)

(52) U.S. Cl.
CPC ......... *F02M 35/0223* (2013.01); *B01D 45/02* (2013.01); *B01D 45/12* (2013.01); *B01D 45/14* (2013.01); *B01D 46/0005* (2013.01); *F02M 35/0202* (2013.01); *F02M 35/0216* (2013.01);

(Continued)

(58) Field of Classification Search
CPC ........... F02M 35/0223; F02M 35/0202; F02M 35/0216; F02M 35/164; F02M 35/084; F02M 35/086; B01D 45/12; B01D 45/02; B01D 45/14; B01D 46/0005
See application file for complete search history.

(56) References Cited

U.S. PATENT DOCUMENTS 3,811,254 A * 5/1974 Amelio ..................... F04F 5/46
                                                    55/306
4,242,115 A * 12/1980 Harold ................... B01D 45/16
                                                    55/347

(Continued)

FOREIGN PATENT DOCUMENTS

| DE | 10235761 A1 | 2/2004 |
|---|---|---|
| EP | 0541857 A1 | 5/1993 |
| EP | 1950407 A2 | 7/2008 |

OTHER PUBLICATIONS

European Search Report issued in counterpart application No. 20172771.6 dated Jul. 16, 2020 (06 pages).

*Primary Examiner* — Dung H Bui

(57) ABSTRACT

A centrifugal air filter for an automotive system includes a plurality of single separators for setting an air flow passing therethrough in a turbulent motion and a separation area surrounding the plurality of single separators. The separation area receives particles from the air flow due to the centrifugal forces. A filter housing portion is located below a predefined or operation position for receiving particles from the air flow due to gravity, and an intake pipe is connected by an extraction line to a connecting pipe emerging on a filter housing and opening into the filter housing portion.

16 Claims, 2 Drawing Sheets

(51) Int. Cl.
 *F02M 35/02* (2006.01)
 *B01D 45/12* (2006.01)
 *F02M 35/16* (2006.01)
 *F02M 35/08* (2006.01)

(52) U.S. Cl.
 CPC ......... *F02M 35/084* (2013.01); *F02M 35/086* (2013.01); *F02M 35/164* (2013.01)

(56) References Cited

U.S. PATENT DOCUMENTS

| | | | |
|---|---|---|---|
| 4,249,922 A | 2/1981 | Saele | |
| 2003/0217534 A1* | 11/2003 | Krisko | B01D 46/525 55/337 |
| 2013/0031878 A1* | 2/2013 | Menssen | F02M 35/0223 55/345 |
| 2014/0102054 A1* | 4/2014 | Wuebbeling | B04C 3/06 55/348 |
| 2014/0260129 A1 | 9/2014 | Rosenfeld et al. | |
| 2015/0343366 A1* | 12/2015 | Wuebbeling | F02M 35/0223 55/337 |
| 2016/0341158 A1 | 11/2016 | Rosenfeld | |
| 2020/0318585 A1* | 10/2020 | Herman | B01D 46/442 |

\* cited by examiner

CENTRIFUGAL AIR FILTER FOR AN AUTOMOTIVE SYSTEM

RELATED APPLICATIONS

This application claims priority to German Patent Application Ser. No. 102019003209.8, filed May 7, 2019, the disclosure of which is hereby incorporated by reference in its entirety.

FIELD OF THE DISCLOSURE

The present disclosure relates to a centrifugal air filter for an automotive system.

BACKGROUND

Conventional centrifugal air filters are typically used as coarse filters for precleaning the charge air of diesel engines fitted with a turbocharger. For this purpose, the centrifugal air filter includes a multiplicity of single separators, which set an air flow passing through them in turbulent motion, so that particles contained in the air flow are flung into a separation area surrounding the single separators due to the centrifugal forces generated in the process. Opening into the separation area is a connecting pipe, which is provided on a surrounding filter housing and on which a negative pressure can be built up, so that the particles present in the separation area can be drawn off outwards. Under gravity, however, these collect predominantly in a portion of the filter housing situated below the respective installation or operating position. In order to achieve the fullest possible extraction, therefore, the connecting pipe would ideally have to be arranged in this area. Confined spaces and the associated installation conditions generally prevent this, so that the intake pipe is often situated at what is, in this respect, an unfavorable point on the filter housing. The static negative pressure built up on the connecting pipe is then generally not sufficient in the long run to prevent the particles settling inside the filter housing. This necessitates frequent laborious dismantling of the centrifugal air filter for the purpose of manual cleaning, particularly under dusty environmental conditions.

There is a need therefore for a centrifugal air filter that ensures a reliable extraction of separated particles even in the event of such unfavorable installation conditions.

SUMMARY

In the present disclosure, a centrifugal air filter for an automotive system includes a multiplicity of single separators, which set an air flow passing through them in turbulent motion, so that particles contained in the air flow are flung into a separation area surrounding the single separators due to the centrifugal forces generated in the process, and under gravity, collect in a filter housing portion lying below a predefined installation or operating position, wherein an intake pipe, which is connected by an extraction line to a connecting pipe emerging on a filter housing, opens into the filter housing portion.

The extraction line allows the intake pipe or its orifice to be arranged directly in the filter housing portion situated below the predefined installation or operating position, so that a deposit of particles is effectively prevented. The connecting pipe may be situated at any other point on the filter housing. In this way, a reliable extraction of the separated particles is ensured even in the event of unfavorable installation conditions.

The negative pressure required on the connecting pipe is built up, for example, in a low-pressure intake area of a radial-flow fan enclosed by a fan scoop, which is an integral part of a cooling arrangement encompassed by the automotive system. For this purpose, the connecting pipe is connected by a flexible rubber hose line to a vacuum connection formed on the fan scoop. The particles extracted in such a way in the separation area of the centrifugal air filter are then transported away into the surroundings by the cooling air flow generated by the radial-flow fan.

The automotive system, for example, is an agricultural, forestry or construction machinery utility vehicle equipped with a supercharged diesel engine.

To save space, the extraction line may run inside the filter housing between the single separators or along a side wall and thereby outside the effective range of the single separators. The extraction line and intake pipe formed thereon may be an integral component of the filter housing produced as an injection-molded plastic part. Alternatively, it is a separate component which can be taken out of the filter housing for cleaning purposes.

In such a case the filter housing may feasibly be of multilayer construction comprising a housing cover that can be removed to expose the separation area. The housing cover is connected to a filter base housing, for example, by a lockable bayonet catch.

The centrifugal air filter is used, in particular, as a coarse filter for precleaning the charge air of a diesel engine to be compressed by a turbocharger. A (multistage) fine filter connected to the outlet side of the centrifugal air filter serves to remove residual contamination before the charge air is delivered to the turbocharger and then to the intake tract of the diesel engine. It should be noted here that the centrifugal air filter may also equally well be used in some other context, for example, as an integral part of an air filter system of a cab ventilation or for coarse filtering the combustion air delivered to some other combustion drive, such as a non-supercharged, naturally aspirated engine, a petrol engine or a gas turbine. In this respect, there are no limits to the field of use of the centrifugal air filter.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the Figure.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
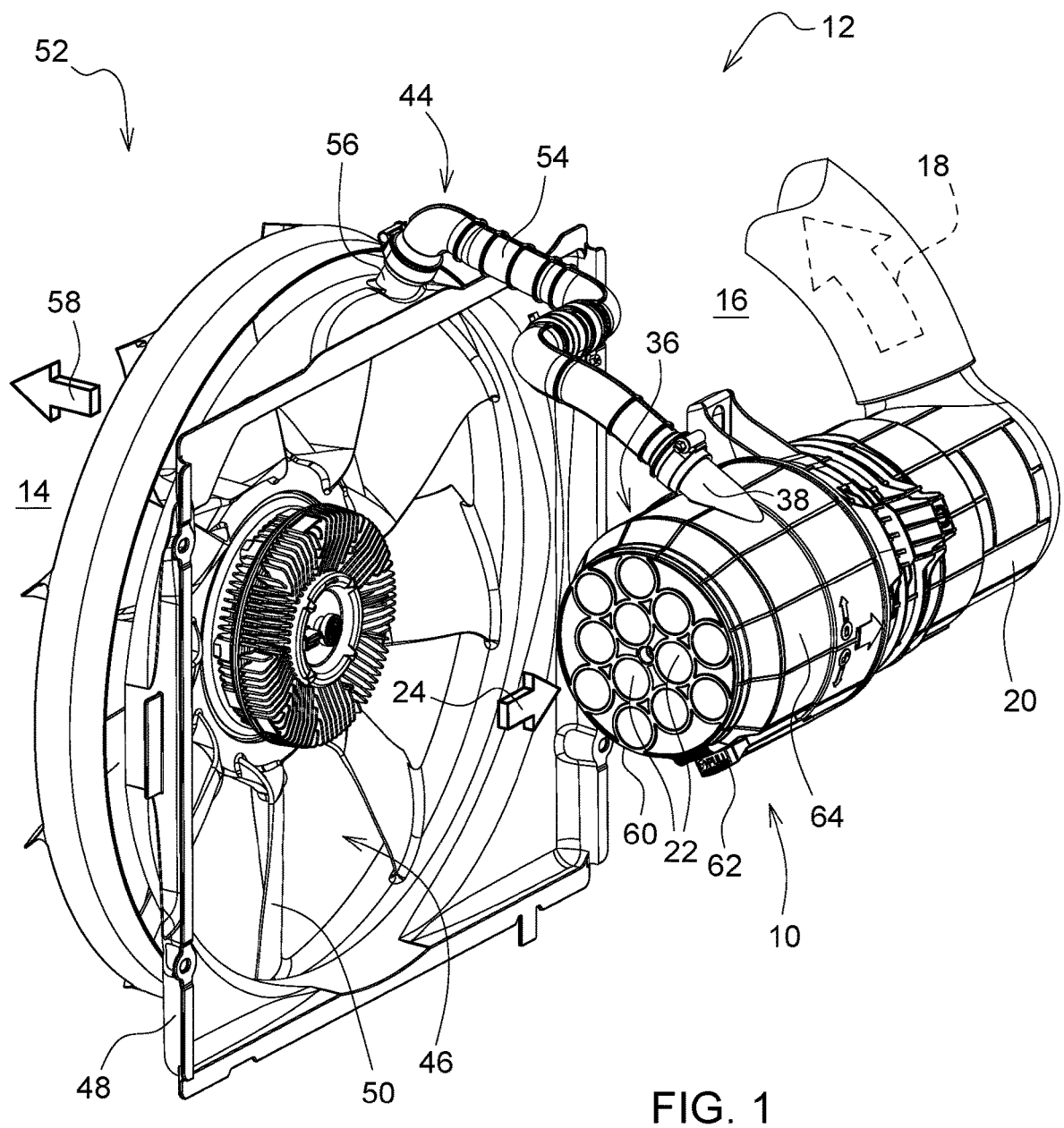
FIG. 1 shows an exemplary embodiment of the centrifugal air filter as an integral part of an automotive system, and FIG. 2 in a simplified representation shows an internal view of the centrifugal air filter in FIG. 1.

FIG. 1 shows an exemplary embodiment of the centrifugal air filter 10 according to the present disclosure as an integral part of an automotive system 12, of which, for reasons of clarity, only the components relevant to the functional working of the centrifugal air filter 10 are shown.

The automotive system 12 is, for example, an off-road agricultural, forestry or construction machinery utility vehicle equipped with a supercharged diesel engine 14.

The centrifugal air filter 10 here is used as a coarse filter for the precleaning of charge air 18 to be compressed by a turbocharger 16. A (multistage) fine filter 20 connected to the outlet side of the centrifugal air filter 10 serves to remove residual contamination before the charge air 18 is delivered to the turbocharger 16 and then to the intake tract of the diesel engine 14.

Figure 2:
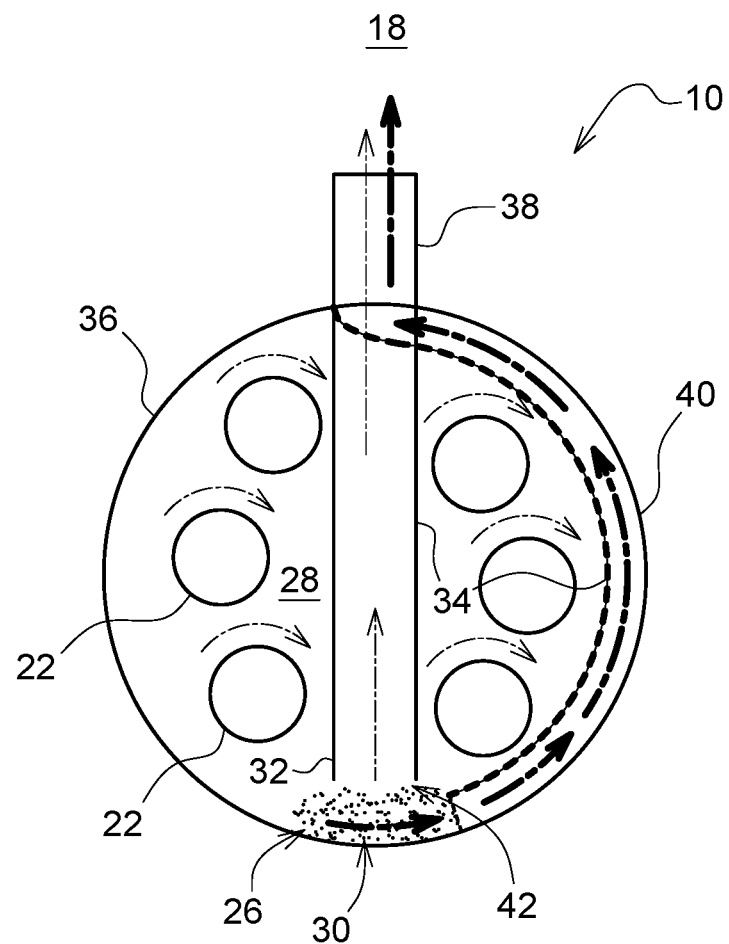

As can be seen in FIG. 2, the centrifugal air filter 10 reproduced in FIG. 1 comprises a multiplicity of single separators or cyclones 22, which set an air flow 24 passing through them in turbulent motion, so that particles 26 contained in the air flow 24 are flung into a separation area 28 surrounding the cyclones 22 due to the centrifugal forces generated in the process, and under gravity collect in a filter housing portion or base area 30 lying below a predefined installation or operating position. An intake pipe 32, which is connected by way of a tubular extraction line 34 to a connecting pipe 38 emerging on a filter housing 36, opens into the base area 30.

For example, to save space the extraction line 34 runs inside the filter housing 36 between the cyclones 22 and in so doing takes the shortest possible path between the base area 30 and the connecting pipe 38. According to the representation in dashed lines, however, this line may also run along a side wall 40 and thereby outside the effective range of the cyclones 22. The extraction line 34 and the intake pipe 32 formed thereon are an integral part of the filter housing 36 produced as an injection-molded plastic part.

The extraction line 34 allows the intake pipe 32 or its orifice 42 to be arranged directly in the base area 30, so that a deposit of particles 26 is effectively prevented. The connecting pipe 38 may be situated at any other point on the filter housing 36, so that a reliable extraction of the separated particles 26 is ensured even in the event of unfavorable installation conditions. In this instance, the connecting pipe 38 is situated on an upper side 44 of the filter housing 36.

The negative pressure required for the extraction of particles 26 is here built up, for example, in a low-pressure intake area 46 of a radial-flow fan 50 enclosed by a fan scoop 48, which is an integral part of a cooling arrangement or system 52 encompassed by the automotive system 12 (the other components associated with the cooling arrangement 52, such as heat exchangers, coolant lines and the like, are omitted in FIG. 1). In this case, the extraction line 34 is connected, by way of a flexible rubber hose line 54 fitted to the connecting pipe 38, to a vacuum connection 56 formed on the fan scoop 48. The particles 26 extracted in the separation area 28 or base area 30 of the centrifugal air filter 10 via the rubber hose line 54 are then transported away into the surroundings by the cooling air flow 58 generated by the radial-flow fan 50.

In order to be able to clean the separation area 28 when required, the filter housing 36 is of multilayer construction and comprises a housing cover 60 that can be removed to expose the separation area 28. The housing cover 60 here is connected to a filter base housing 64 by a bayonet catch that can be locked by way of an operating element 62.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A centrifugal air filter for an automotive system, comprising:
   a filter housing;
   a plurality of single separators for setting an air flow passing therethrough in a turbulent motion;
   a separation area surrounding the plurality of single separators, the separation area receiving particles from the air flow due to the centrifugal forces;
   a filter housing portion lying below a predefined or operation position for receiving particles from the air flow due to gravity;
   a tubular extraction line;
   a connecting pipe; and
   an intake pipe connected by the tubular extraction line to the connecting pipe emerging on the filter housing and opening into the filter housing portion;
   wherein the tubular extraction line runs inside the filter housing between the plurality of single separators; and
   wherein the tubular extraction line runs along a side wall inside the filter housing.

2. The centrifugal air filter of claim 1, wherein the filter housing comprises multilayer construction.

3. The centrifugal air filter of claim 2, wherein the filter housing comprises a housing cover which is removable to expose the separation area.

4. The centrifugal air filter of claim 3, further comprising a filter base housing connected to the housing cover via an operating element.

5. The centrifugal air filter of claim 1, further comprising a coarse filter for precleaning a charge air of a diesel engine to be compressed by a turbocharger.

6. The centrifugal air filter of claim 1, further comprising an outlet side to which a second filter is connected.

7. The centrifugal air filter of claim 6, wherein the tubular extraction line, intake pipe and filter housing comprise an injection-molded plastic part.

8. The centrifugal air filter of claim 1, wherein the tubular extraction line and the intake pipe are integrally formed with the filter housing.

9. The centrifugal air filter of claim 1, wherein an orifice of the intake pipe is located directly in the filter housing portion.

10. The centrifugal air filter of claim 1, wherein the connecting pipe is positioned on an upper side of the filter housing.

11. The centrifugal air filter of claim 1, wherein the tubular extraction line is coupled to the connecting pipe via a flexible hose line.

12. An automotive system, comprising:
   an engine;
   a turbocharger coupled to the engine;
   a cooling system; and a centrifugal air filter for precleaning a charge air to be compressed by the turbocharger, the air filter comprising:
- a filter housing;
- a plurality of single separators for setting an air flow passing therethrough in a turbulent motion;
- a separation area surrounding the plurality of single separators, the separation area receiving particles from the air flow due to the centrifugal forces;
- a filter housing portion lying below a predefined or operation position for receiving particles from the air flow due to gravity;
- a tubular extraction line;
- a connecting pipe; and
- an intake pipe connected by the tubular extraction line to the connecting pipe emerging on the filter housing and opening into the filter housing portion;
- wherein the tubular extraction line runs inside the filter housing between the plurality of single separators; and
- wherein the tubular extraction line runs along a side wall inside the filter housing.

13. The automotive system of claim 12, wherein the cooling system comprises:
- a radial-flow fan;
- a fan scoop enclosing the fan;
- a low-pressure intake area for building up negative pressure for extracting the particles; and
- a vacuum connection formed on the fan scoop for coupling to the tubular extraction line.

14. The automotive system of claim 13, wherein the tubular extraction line is connected to the vacuum connection.

15. The automotive system of claim 12, wherein the connecting pipe is positioned on an upper side of the filter housing.

16. A centrifugal air filter for an automotive system, comprising:
- a filter housing;
- a plurality of single separators for setting an air flow passing therethrough in a turbulent motion;
- a separation area surrounding the plurality of single separators, the separation area receiving particles from the air flow due to the centrifugal forces;
- a filter housing portion lying below a predefined or operation position for receiving particles from the air flow due to gravity;
- a tubular extraction line;
- a connecting pipe;
- an intake pipe connected by the tubular extraction line to the connecting pipe emerging on the filter housing and opening into the filter housing portion; and
- a filter base housing connected to the housing cover via an operating element;
- wherein the filter housing comprises multilayer construction and a housing cover which is removable to expose the separation area;
- wherein the tubular extraction line runs inside the filter housing between the plurality of single separators; and
- wherein the tubular extraction line runs along a side wall inside the filter housing.

* * * * *